United States Patent
Endresen

(10) Patent No.: US 8,971,407 B2
(45) Date of Patent: Mar. 3, 2015

(54) DETECTION OF SKIP MODE

(71) Applicant: Pexip AS, Lysaker (NO)

(72) Inventor: Lars Petter Endresen, Nesoddtangen (NO)

(73) Assignee: Pexip AS, Lysaker (NO)

( * ) Notice: Subject to any disclaimer, the term of this patent is extended or adjusted under 35 U.S.C. 154(b) by 0 days.

(21) Appl. No.: 13/945,152

(22) Filed: Jul. 18, 2013

(65) Prior Publication Data

US 2014/0133555 A1    May 15, 2014

Related U.S. Application Data

(60) Provisional application No. 61/726,723, filed on Nov. 15, 2012.

(30) Foreign Application Priority Data

Nov. 15, 2012   (NO) .................................. 20121355

(51) Int. Cl.
| | | |
|---|---|---|
| *H04N 7/12* | (2006.01) | |
| *H04N 11/02* | (2006.01) | |
| *H04N 11/04* | (2006.01) | |
| *H04B 1/66* | (2006.01) | |
| *H04N 5/14* | (2006.01) | |
| *H04N 9/64* | (2006.01) | |
| *H04N 19/61* | (2014.01) | |

(52) U.S. Cl.
CPC .............................. *H04N 19/00781* (2013.01)
USPC ............ 375/240.12; 375/240.16; 375/240.24; 348/699

(58) Field of Classification Search
CPC ................. H04N 19/00781; H04N 19/00278; H04N 19/00587; H04N 19/00884; H04N 19/00545; G06F 9/30036; G06F 9/3887; H03M 7/4006
USPC ............ 375/240.12, 240.16, 240.24; 348/699
See application file for complete search history.

(56) References Cited

U.S. PATENT DOCUMENTS

| | | | |
|---|---|---|---|
| 7,295,613 B2 | 11/2007 | Bjontegaard | |
| 7,873,812 B1 | 1/2011 | Mimar | |
| 2003/0014457 A1* | 1/2003 | Desai et al. | ................... 708/520 |
| 2004/0264575 A1 | 12/2004 | Bjontegaard | |
| 2005/0125624 A1 | 6/2005 | Rose et al. | |
| 2006/0078052 A1* | 4/2006 | Dang | ....................... 375/240.24 |
| 2008/0056350 A1* | 3/2008 | Lyashevsky et al. | ...... 375/240.1 |

(Continued)

OTHER PUBLICATIONS

Chiang, Jui-Chiu et al., Block-based Distributed Video Coding with Variable Block Modes, 978-1-4244-5309-2, 2010 IEEE, pp. 125-128.

(Continued)

*Primary Examiner* — Joseph Ustaris
*Assistant Examiner* — Farhan Mahmud
(74) *Attorney, Agent, or Firm* — Christopher & Weisberg, P.A.

(57) ABSTRACT

A method to quickly determine whether a macroblock in H.264 or other similar standards should be encoded in skip mode in a SIMD processor environment is provided. The method exploits the fact that the processor provides enough register space to store N=4 4×4 set of 8 bits data. By performing 4 consecutive reads of 16 linear aligned values into 16 SIMD register variables each capable of storing 16 values, the entire data set for operating can be stored within the processors SIMD register variables and can be operated upon, without any memory related latency.

12 Claims, 2 Drawing Sheets

| 0 | 1 | 2 | 3 |
|---|---|---|---|
| 4 | 5 | 6 | 7 |
| 8 | 9 | 10 | 11 |
| 12 | 13 | 14 | 15 |

(56) References Cited

U.S. PATENT DOCUMENTS

| | | | |
|---|---|---|---|
| 2008/0151999 A1 | 6/2008 | Youn et al. | |
| 2009/0003446 A1* | 1/2009 | Wu et al. | 375/240.16 |
| 2009/0074052 A1* | 3/2009 | Fukuhara et al. | 375/240.01 |
| 2009/0147849 A1* | 6/2009 | Au et al. | 375/240.13 |
| 2009/0307656 A1* | 12/2009 | Eichenberger et al. | 717/110 |

OTHER PUBLICATIONS

Ho, Il Bang. et al., An Efficient Skipping Method of H.264/AVC Weighted Prediction for Various Illuminating Effects, 978-1-4244-5309-2, 2010 IEEE, pp. 1177-1180.

Song, Hongtao et al., Novel Fast Motion Estimation and Mode Decision for H.264 Real-Time High-Definition Encoding, 978-1-4673-0964-6, 2012 IEEE, pp. 43-48.

Sang-Jun Yu et al., Multimedia: An SIMD-Based Efficient 4×4 2 D Transform Method, ISBN: 978-3-54-045234, ICCA 2005, LNCS vol. 3480, pp. 166-175.

Yu-Lun Lai et al., H.264 encoder speed-up via joint algorithm/code-level optimization, Jul. 12, 2005, vol. 5960.

Nathan T. Slingerland et al., "Multimedia extensions for general purpose microprocessors: a survey", Microprocessors and Microsystems, IPC Business Pre Ltd. London, GB, vol. 29, No. 5, Jun. 1, 2005, pp. 225-246, XP027766885, ISSN: 0141-9331.

International Type Search Report dated Aug. 8, 2013 for National Application No. 20121355, International Filing Date: Nov. 15, 2012 consisting of 5-pages.

Norwegian Search Report dated Jun. 7, 2013 for Norwegian Application No. 20121355, filed on Nov. 16, 2012 consisting of 2 pages.

* cited by examiner

| 0 | 1 | 2 | 3 |
|---|---|---|---|
| 4 | 5 | 6 | 7 |
| 8 | 9 | 10 | 11 |
| 12 | 13 | 14 | 15 |

DETECTION OF SKIP MODE

CROSS-REFERENCE TO RELATED APPLICATIONS

This application claims priority to U.S. Provisional Patent Application Ser. No. 61/726,723, filed Nov. 15, 2012, entitled DETERMINING SKIP MODE and claims priority to Norwegian Patent Application No. 20121355, filed Nov. 16, 2012, entitled DETECTION OF SKIP MODE, the entirety of both of which are incorporated herein by reference.

TECHNICAL FIELD

The present invention relates to video coding, particularly to determine skip mode blocks in video coding schemes.

BACKGROUND

Transmission of moving pictures in real-time is employed in several applications like e.g. video conferencing, net meetings and video telephony.

However, representing moving pictures requires bulk information as digital video is typically represented by up to 60 pictures each second, each picture represented by a large number of pixels, which in turn is represented by at least one byte of digital data. Such uncompressed video data results in large data volumes, and cannot be transferred over conventional communication networks and transmission lines in real as it would require an unrealistic network bandwidth.

Thus, real time video transmission video compression, where the main goal is to represent the video information with as few bits introducing as low latency as possible without compromising too much with video quality.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation, and is usually referred to as the residual.

The residual represented as a block of data (e.g. 4×4 pixels) still contains internal correlation. A well-known method for taking advantage of this is to perform a two dimensional block transform. The ITU recommendation H.264 uses a 4×4 integer DCT transform. This transforms 4×4 pixels into 4×4 transform coefficients and they can usually be represented by fewer bits than the pixel representation.

Transform of a 4×4 array of pixels with internal correlation will probably result in a 4×4 block of transform coefficients with much fewer non-zero values than the original 4×4 pixel block.

Direct representation of the transform coefficients is still too costly for many applications. A quantization process is carried out for a further reduction of the data representation. Hence the transform coefficients undergo quantization. The possible value range of the transform coefficients is divided into value intervals each limited by an uppermost and lowermost decision value and assigned a as fixed quantization value. The transform coefficients are then quantified to the quantization value associated with the intervals within which the respective coefficients re-side. Coefficients being lower than the lowest decision value are quantified to zeros. It should be mentioned that this quantization process results in that the reconstructed video sequence is somewhat different compared to the uncompressed sequence.

As already indicated, one characteristic of video content to be coded is that the requirements for bits to describe the sequence is strongly varying. For several applications it is well known for a person skilled in the art that the content in a considerable part of the picture is unchanged from frame to frame. H.264 widens this definition so that parts of the picture with constant motion can also be coded without use of additional information. Regions with little or no change from frame to frame require a minimum number of bits to be represented. The blocks included in such regions are defined as "skipped" or to be in "skip mode", reflecting that no changes or only predictable motion relative to the corresponding; previous blocks occur, hence no data is required for representing these blocks other than an indication that the blocks are to be decoded as "skipped". This indication may be common to several macro blocks.

As H.264 is a decoding specification, it does not describe any methods for detecting regions of marginal or no changes prior to the transformation and quantization process. As a result, these regions could undergo both motion search, transformation and quantization, even if they finally would be defined as skipped and not represented with any data. As these operations require processing capacity, this is unnecessary consumption of resources in the encoder.

Video encoding for HD formats increases the demands for memory and data processing, and requires efficient and high bandwidth memory organizations coupled with compute intensive capabilities. Due to these multiple demands, a flexible parallel processing approach must be found to meet the demands in a cost effective manner.

Video codecs are typically installed on customized hardware in video endpoints with DSP based processors. However, it has recently become more common to install video codecs in general purpose processors with a SIMD processor environment.

Normally the "early skip" process mentioned above is a complicated process that is computationally expensive, since one has to manually transform and quantize each of the 16 4×4 blocks, one by one, utilizing 16-bit and 32 bit precision that leads to extensive register usage in SIMD processor environment.

A simplification of the "early skip" process is described in U.S. Pat. No. 7,295,613 "Early detection of zeros in the transform domain" by Gisle Bjøntegaard. However, this simplification does not take into account the SIMD processor environment, and is using Hadamard transform in the detection of "early skip" instead of DCT. In addition, Bjøntegaard calculates just a few coefficients and compares with a scalar threshold. This may lead to inaccurate results degrading perceived video quality without achieving any significant improvement in SIMD processor utilization.

Therefore, there is a need for a time and processor efficient "early skip" method taking advantage of the nature of the general purpose processors in a SIMD processor environment without compromising with data quality.

SUMMARY

Embodiments herein relates to a method of video coding implemented in a processor device for preparing to determine whether 4×4 pixel blocks within a macroblock of transformed residual pixel values should be indicated as "skipped" according to a coding standard, where the pixel position values of the macroblock are denoted as xij, where i is the vertical pixel position within the macroblock and j is the horizontal pixel position of the macroblock. The, steps: loading current values of the macroblock of the positions xi0 to xi3 into a first SIMD vector or xi0 to xi3 and x(i+4)0 to x(i+4)3 into the first SIMD 32 vector, or xi0 to xi3 and x(i+4)0 to x(i+4)3 and x(i+8)0 to x(i+8)3 and x(i+12)0 to x(i+12)3 into the first SIMD vector and converting bytes of the first SIMD vector from unsigned to signed, loading predicted values of the macroblock of the positions xi0 to xi3 into a second SIMD vector or xi0 to xi3 and x(i+4)0 to x(i+4)3 into the second SIMD vector, or xi0 to xi3 and x(i+4)0 to x(i+4)3 and x(i+8)0 to x(i+8)3 and x(i+12)0 to x(i+12)3 into the second SIMD vector and converting bytes of the second SIMD vector from unsigned to signed, substracting values of the first SIMD vector and the values of corresponding positions of the second SIMD vector and performing a 8-bit saturation of the resulting values and loading the resulting values into a third SIMD vector, transforming the third SIMD vector horizontally and loading the result into a fourth SIMD vector, transposing the fourth SIMD vector, and transforming the fourth transposed SIMD vector vertically and loading the result into a fifth SIMD vector are performed.

In embodiments herein, a method with the steps:
a) Setting i=0,
b) performing the steps I-VI,
c) setting i=i+1
d) repeating step b) and c) if i<4
is provided.

In embodiments herein, a method comparing values of the fifth SIMD vector associated with a 4×4 pixel block of the macroblock with corresponding values in a vector of thresholds is provided. If more than a predefined number of the values of the fifth SIMD vector associated with a 4×4 pixel block are lower than the corresponding values in a vector of thresholds, then defining the 4×4 pixel block as "skipped".

In embodiments herein, a method weighting and summing values of the fifth SIMD vector associated with a 4×4 pixel block of the macroblock resulting in an energy value associated with the 4×4 pixel block is provided. If the energy value is lower than a predefined threshold, then defining the 4×4 pixel block as "skipped".

In embodiments herein, a method performing a 8-bit saturation of the resulting values includes assigning all resulting values higher than 127 to 127, and assigning all resulting values lower than −128 to −128 is provided.

In embodiments herein, a method converting bytes from unsigned to signed includes adding −128 to the respective bytes is provided.

In embodiments herein, a method where the coding standard is the H.264/AVC coding standard is provided.

In embodiments herein, a method where the processor device is an Intel processor device is provided.

In embodiments herein, a method where the processor device is an AMD processor device is provided.

In other embodiments herein, a computer program product according to the claimed method is provided.

In still further embodiments herein, a processor device for preparing to determine whether 4×4 pixel blocks within a macroblock of transformed residual pixel values should be indicated as "skipped" according to a coding standard during video coding is provided. The pixel position values of the macroblock are denoted as xij, where i is the vertical pixel position within the macroblock and j is the horizontal pixel position of the macroblock. The processor further comprises a processing circuit configured to:

I. Load current values of the macroblock of the positions xi0 to xi3 into a first SIMD vector or xi0 to xi3 and x(i+4)0 to x(i+4)3 into the first SIMD 32 vector, or xi0 to xi3 and x(i+4)0 to x(i+4)3 and x(i+8)0 to x(i+8)3 and x(i+12)0 to x(i+12)3 into the first SIMD vector and converting bytes of the first SIMD vector from unsigned to signed, II. Load predicted values of the macroblock of the positions xi0 to xi3 into a second SIMD vector or xi0 to xi3 and x(i+4)0 to x(i+4)3 into the second SIMD vector, or xi0 to xi3 and x(i+4)0 to x(i+4)3 and x(i+8)0 to x(i+8)3 and x(i+12)0 to x(i+12)3 into the second SIMD vector and converting bytes of the second SIMD vector from unsigned to signed, III. Subtract values of the first SIMD vector and the values of corresponding positions of the second SIMD vector and performing a 8-bit saturation of the resulting values and loading the resulting values into a third SIMD vector, IV. Transform the third SIMD vector horizontally with 8-bit saturation arithmetic and loading the result into a fourth SIMD vector, V. Transpose the fourth SIMD vector, VI. Transform the fourth transposed SIMD vector vertically with 8-bit saturation arithmetic and loading the result into a fifth SIMD vector.

In embodiments herein, a processor device with the processor circuit further configured to:
a) Set i=0,
b) perform the steps I-VI,
c) set i=i+1
d) repeat step b) and c) if i<4
is provided.

DETAILED DESCRIPTION OF AN EXAMPLE EMBODIMENT

Embodiments herein describe a method to quickly determine whether a macroblock in H.264 or other similar standards should be encoded in skip mode. The energy of the frequency components are calculated after forward transform and quantization. Normally, this is a complicated process that is computationally expensive, since one has to manually transform and quantize each of the 16 4×4 block, one by one, utilizing 16-bit and 32 bit precision that leads to extensive register usage, especially in SIMD (Single Instruction, Multiple Data) environments. SIMD is a class of parallel computers in Flynn's taxonomy. It describes computers with multiple processing elements that perform the same operation on multiple data points simultaneously. Thus, such machines exploit data level parallelism. Examples of processors with a SIMD environment is Intel and AMD processors.

The processing circuit may be a processing unit, a processor, an application specific integrated circuit (ASIC), a field-programmable gate array (FPGA) or the like. As an example, a processor, an ASIC, an FPGA or the like may comprise one or more processor kernels.

Figures 1, 2:
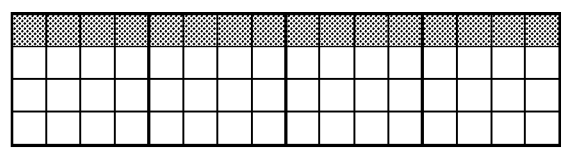
FIG. 1 shows a macroblock divided into numbered blocks.
FIG. 2 illustrates 4 4×4 blocks.

FIG. 1 illustrates a macroblock representing 16×16 pixels of a picture, which is further broken down to 4×4 blocks. Each of the 4×4 blocks is numbered to be referred to in the following description. According to prior art, the transform is done for each 4×4 block, but according to embodiments herein, N 4×4 blocks are transformed at a time, using 8-bit saturating arithmetical calculations that limits the register usage significantly. 8-bit saturating means simply denoting all absolute values above 127 to 127, and all values below −128 to −127. This approximation may lead to somewhat reduced precision, but in the case of transforming to determine whether the blocks should be defined as skip or not skip, the inventor has realized that it is highly unlikely that the calculations may exceed 8-bit precision anyway.

This is due to nature of the residual information from which the transformation is calculated. In the data areas where skip is to be considered, the difference between current and predicted block is so small that it is predominately likely that 8 bits per pixel are sufficient to represent the residuals without resulting in an incorrect decision. 8 bits can represent values between [−128,127], and if a number of residuals in a block are outside this interval, the block should be probably be defined as not skipped anyway since thresholds for skip typically may involve average residuals of 2 or 3 bits per pixel only.

Further, it is a major challenge that many algorithms involve vector sizes that are only a fraction of the register sizes in modern microprocessors. While one can add two vectors with 16 elements in a single clock cycle, a problem may require the adding of two vectors of 4 elements only, leaving the 16−4=12 elements in the register unused. If, however, the problem can be reformulated to use vectors of size 16, the speedup will be 16/4=4.

The algorithm according to embodiments herein can be exemplified on a high level with the steps:

1. Load N=4, 8 or 16 4×4 current blocks and convert from unsigned to signed bytes.
2. Load N=4, 8 or 16 4×4 predicted blocks and convert from unsigned to signed bytes.
3. Calculate the residual using 8-bit saturation arithmetic.
4. Transform the N=4, 8 or 16 4×4 blocks horizontally using 8-bit saturation arithmetic.
5. Transpose the N=4, 8 or 16 4×4 blocks.
6. Transform the N=4, 8 or 16 4×4 blocks vertically using 8-bit saturation arithmetic.
7. Calculate the absolute value of the N 4×4 block coefficients.
8. Compare the N=4, 8 or 16 4×4 block coefficients with a vector of threshold.

An unsigned byte is a byte of the value range [0,255], and a signed byte is a byte of the value range [−128,127].

Loading, for example N=4 4×4 blocks at a time in a SIMD environment means that pixel positions x00, x01, x02, and x03 of 4×4 block number 0 of the block will be loaded in the 0-3 positions of a first SIMD vector and the pixel positions x00, x01, x02, and x03 of 4×4 block number 1 of the macroblock will be loaded in the 4-7 positions, pixel positions x00, x01, x02, and x03 of 4×4 block number 2 of the macroblock will be loaded in the 8-11 positions, and pixel positions x00, x01, x02, and x03 of 4×4 block number 3 of the macroblock will be loaded in the 12-15 positions of the vector. This SIMD vector will therefore consecutively be filled with the upper lines of the N=4 4×4 blocks, being highlighted in FIG. 2.

Further, pixel positions x10, x11, x12, and x13 of 4×4 block number 0 of the macroblock will be loaded in the 0-3 positions of a second SIMD vector, and the pixel positions x10, x11, x12, and x13 of 4×4 block number 1 of the macroblock will be loaded in the 4-7 positions, pixel positions x10, x11, x12, and x13 of 4×4 block number 2 of the macroblock will be loaded in the 8-11 positions, and pixel positions x10, x11, x12, and x13 of 4×4 block number 3 of the macroblock will be loaded in the 12-15 positions of the vector. This continues accordingly until the all the pixel position values of all the N=4 4×4 blocks are filled in totally 4 SIMD vectors.

Calculating the residual in step 3 involves performing a SIMD addition function on the loaded, saturated SIMD vectors, resulting in a simultaneous residual calculation on N=4 4×4 blocks at a time. One SIMD vector will then include a line of residuals of four 4×4 blocks in the same line, thus utilizing the whole size of the vector.

The method according to embodiments herein exploits the fact that the processor provides enough register space to store N=4 4×4 set of 8 bits data. By performing 4 consecutive reads of 16 linear aligned values into 16 SIMD register variables each capable of storing 16 values, the entire data set for operating can be stored within the processors SIMD register variables and can be operated upon, without any memory related latency. The horizontal transform function can then further be performed in step 4 on the N=4 4×4 blocks by a matrix multiplication according to the standard.

The structure of the symmetry of the transform matrix of H.246 and similar standards allows the complete transform procedure to be performed in a four step way of "transform horizontally-transpose-transform horizontally-transpose". In the example algorithm above, except from the last transpose step, this is executed in the steps 4-6. Omitting the last transpose step can be done since the result will not be used as the basis for transmitted coded data, but only for comparing with a vector set for blockwise skip or not skip decisions.

This comparison step is done in step 8 after having calculated the absolute values of the transformed values. It may include comparing the transformed absolute values with a vector of thresholds and/or comparing the "energy" of the coefficient matrix with an energy threshold. The "energy" of the coefficient matrix would be calculated by a function weighting and summing the coefficients. The vector of thresholds and the energy threshold would depend on the actual quantization resolution being used in the general coding. Determining whether a block should be defined as skipped or not skipped is essentially to predict whether the majority of the transform coefficients in the real coded data will be zero after the quantization step, which in turn means being in the lowest quantization interval. The vector of thresholds may then include the lowest quantization threshold for each block position.

This procedure in the example above only includes determining skip mode of the four blocks 0-3. To determine skip mode for the remaining blocks 4-15 of the macroblock, the steps are repeated 4 times and the method returns "true" if a block can be skipped and "false" if a block cannot be skipped.

In the following, an example of one low level implementation of embodiments herein is further described.

In H.264 the forward 4×4 transform is normally written in the following manner:

$$[Y]=[A][X][A]^T$$

Where [Y] is the coefficient matrix, [A] is the transform matrix and [X] is the residual matrix. [A] may be a DCT transform like this:

$$[A] = \begin{bmatrix} 1 & 1 & 1 & 1 \\ 2 & 1 & -1 & 2 \\ 1 & -1 & -1 & 1 \\ 1 & -2 & 2 & -1 \end{bmatrix}$$

Prior art describes methods with 4-way SIMD utilizing vector of length 4 and 32 bit instructions. However, according to an aspect of embodiments herein, a 16-way, 32-way or 64-way SIMD method utilizing vector of length N=16, 32 or 64 and 8 bit instructions is used. As already indicated, this can be done by processing more than 4×4 pixels at a time. Involving the matrixes disclosed above, this implies for N=16, $$[Y] = \begin{bmatrix} 1 & 1 & 1 & 11 & 1 & 1 & 11 & 1 & 1 & 11 & 1 & 1 & 1 \\ 2 & 1 & -1 & 22 & 1 & -1 & 22 & 1 & -1 & 22 & 1 & -1 & 2 \\ 1 & -1 & -1 & 11 & -1 & -1 & 11 & -1 & -1 & 11 & -1 & -1 & 1 \\ 1 & -2 & 2 & -11 & -2 & 2 & -11 & -2 & 2 & -11 & -2 & 2 & -1 \end{bmatrix}[X]$$

$$\begin{bmatrix} 1 & 2 & 1 & 11 & 2 & 1 & 11 & 2 & 1 & 11 & 2 & 1 & 1 \\ 1 & 1 & -1 & -21 & 1 & -1 & -21 & 1 & -1 & -21 & 1 & -1 & -2 \\ 1 & -1 & -1 & 21 & -1 & -1 & 21 & -1 & -1 & 21 & -1 & -1 & 2 \\ 1 & -2 & 1 & -11 & -2 & 1 & -11 & -2 & 1 & -11 & -2 & 1 & -1 \end{bmatrix}$$

Here, four [A] matrix and four [A]T matrix are respectively merged to one to be able to perform simultaneous operations on four blocks.

In the implementation, [Y] may be calculated in two operation, first [A][X] and then ([A][X]) $[A]^T$ In a 16×16 macroblock, there are altogether 16 4×4 blocks, and according to embodiments herein either four 16×4 transforms, two 32×4 or one 64×4 transform must be done. According to embodiments herein, many blocks can be transformed in parallel due to the ever increasing register size in modern microprocessors. Intel, for example, have extended the size of vector registers from legacy 128-bits xmm registers to current generation 256-bits ymm registers and future 512-bits zmm registers.

Figure 3:
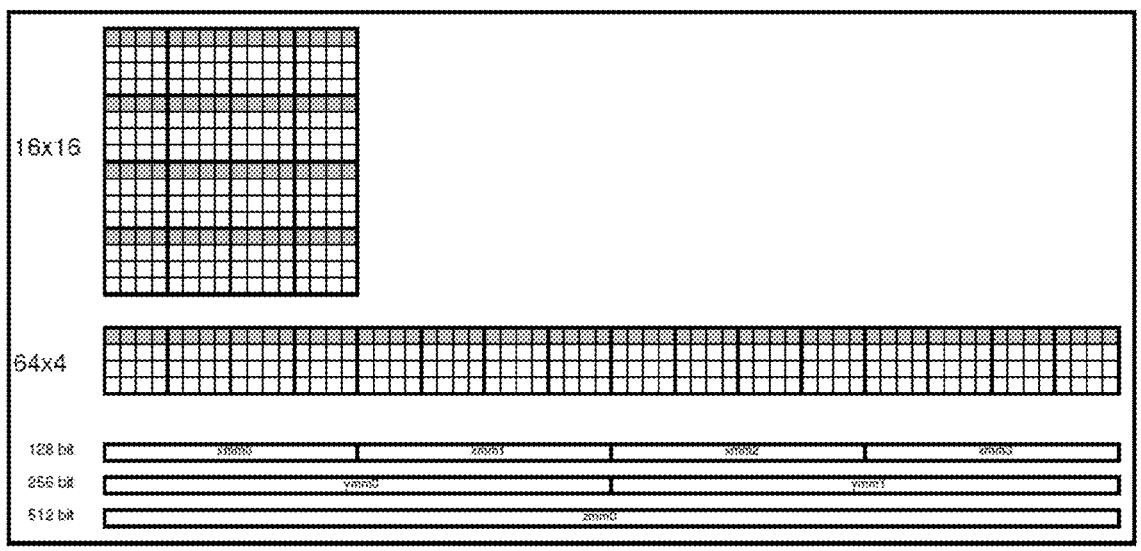
FIG. 3 illustrates a 16×16 block and how it can be rearranged to an imaginary 4×64 block for utilizing hardware supporting 256 instructions.

Referring now to FIG. 3, in order to take fully advantage of the 512 bit zmm registers, 64 pixels from a 16×16 macroblock could be in the following manner: zmm0, contains line0, line4, line8 and line12 (illustrated below with grey colour), zmm1 contains line1, line5, line9, and line13, zmm2 contains line2, line6, line10 and line14 and finally zmm3 contains line3, line7, line11 and line15.

Normally each of the 16 4×4 macroblocks must be transformed separately, for example in the following manner:

```
for (int i=0; i < 4; i++)
{
    int t0 = block[0*4+i] + block[3*4+i];
    int t1 = block[1*4+i] + block[2*4+i];
    int t2 = block[1*4+i] – block[2*4+i];
    int t3 = block[0*4+i] – block[3*4+i];
    block[0*4+i] = t0 + t1;
    block[1*4+i] = t2 + (t3 + t3);
```

-continued

```
    block[2*4+i] = t0 – t1;
    block[3*4+i] = t3 – (t2 + t2);
}
```

Here we instead propose to transform all the 16 4×4 blocks simultaneously.

```
for (int i=0; i < 64; i++)
{
    int8_t t0 = sat(block[0*64+i] + block[3*64+i]);
    int8_t t1 = sat(block[1*64+i] + block[2*64+i]);
    int8_t t2 = sat(block[1*64+i] – block[2*64+i]);
    int8_t t3 = sat(block[0*64+i] – block[3*64+i]);
    block[0*64+i] = sat(t0 + t1);
    block[1*64+i] = sat(t2 + sat(t3 + t3));
```

-continued

```
    block[2*64+i] = sat(t0 – t1);
    block[3*64+i] = sat(t3 – sat(t2 + t2));
}
```

If the hardware supports 128 bit instructions, one vector of 64 pixel (SIMD 16) would need to be stored in four 128 bit xmm register, xmm0, xmm1, xmm2 and xmm3, else if the hardware supports 256 bit instructions (SIMD 32), one vector of 64 pixel would need to be stored in two 256 bit ymm registers, ymm0 and ymm1, and finally if the hardware supports 512 bit instructions (SIMD 64), one vector of 64 pixel would need to be stored in a single 512 bit ymm0 register. In the case in which more than one register is needed to store 64 pixels, a loop over 64 pixels can be effectively unrolled and lead to increased instruction level parallelism. For example, with current generation 256 bit ymm registers, the loop can be rewritten to

```
for (int i=0; i < 32; i++)
{
    int8_t t0 = sat(block[0*64+i] + block[3*64+i]);
    int8_t t1 = sat(block[1*64+i] + block[2*64+i]);
    int8_t t2 = sat(block[1*64+i] – block[2*64+i]);
    int8_t t3 = sat(block[0*64+i] – block[3*64+i]);
    int8_t t3 = sat(block[0*64+i+32] + block[3*64+i+32]);
    int8_t t4 = sat(block[1*64+i+32] + block[2*64+i+32]);
    int8_t t5 = sat(block[1*64+i+32] – block[2*64+i+32]);
    int8_t t6 = sat(block[0*64+i+32] – block[3*64+i+32]);
    block[0*64+i] = sat(t0 + t1);
    block[1*64+i] = sat(t2 + sat(t3 + t3));
    block[2*64+i] = sat(t0 – t1);
    block[3*64+i] = sat(t3 – sat(t2 + t2));
    block[0*64+i+32] = sat(t4 + t5);
    block[1*64+i+32] = sat(t6 + sat(t7 + t7));
```

-continued

```
    block[2*64+i+32] = sat(t4 − t5);
    block[3*64+i+32] = sat(t7 − sat(t6 + t6));
}
```

With the introduction of SSE2 (Streaming SIMD Extensions 2), the register is extended to length to 128 bit, making it possible to store 16 elements of 8 bit in a single register, which is a perfect match for implementations according to embodiments herein of the 4×4 transform in H.264. The reformulation of the problem actually means that one is doing the 16×4 transform in a single step, operating on elements from all the 4 4×4 block simultaneously. Thus one vector contains 16 pixels from 4 4×4 blocks, while one vector in the standard formulation contains 4 pixel from a single 4×4 block, as indicated in FIG. 2.

Then, once the first matrix multiplication in the transform is done, a 16×4 transposition can be done, making rows to columns and columns to rows, and repeat the same calculation over again utilizing vectors of length 16.

An example of a C code comparison between implementation according to prior art and implementation according to embodiments herein is shown below. The upper for loop is a common implementation utilizing 4-way SIMD. The lower for loop is our implementation utilizing 16-way SIMD.

```
for (int i=0; i < 4; i++)
{
    int t0 = block[0*4+i] + block[3*4+i];
    int t1 = block[1*4+i] + block[2*4+i];
    int t2 = block[1*4+i] − block[2*4+i];
    int t3 = block[0*4+i] − block[3*4+i];
    block[0*4+i] = t0 + t1;
    block[1*4+i] = t2 + (t3 + t3);
    block[2*4+i] = t0 − t1;
    block[3*4+i] = t3 − (t2 + t2);
}
for (int i=0; i < 64; i++)
{
    int8_t t0 = sat(block[0*16+i] + block[3*16+i]);
    int8_t t1 = sat(block[1*16+i] + block[2*16+i]);
    int8_t t2 = sat(block[1*16+i] − block[2*16+i]);
    int8_t t3 = sat(block[0*16+i] − block[3*16+i]);
    block[0*16+i] = sat(t0 + t1);
    block[1*16+i] = sat(t2 + sat(t3 + t3));
    block[2*16+i] = sat(t0 − t1);
    block[3*16+i] = sat(t3 − sat(t2 + t2));
}
```

Since embodiments herein allows using 8-bit SIMD for all calculations, the resulting method uses 132 clock ticks only, which is sufficiently fast for a real time application.

The invention claimed is:

1. A method of video coding implemented in a processor device for preparing to determine whether 4×4 pixel blocks within a macroblock of transformed residual pixel values should be indicated as skipped according to a coding standard, where the pixel position values of the macroblock are denoted as $x_{ij}$, where i is the vertical pixel position within the macroblock and j is the horizontal pixel position of the macroblock, comprising the steps of:

I. loading current values of the macroblock of the positions one of: $x_{i0}$ to $x_{i3}$ into a first Single Instruction, Multiple Data (SIMD) vector, $x_{i0}$ to $x_{i3}$ and $x_{(i+4)0}$ to $X_{(i+4)3}$ into the first SIMD vector, and $x_{i0}$ to $x_{i3}$ and $X_{(i+4)0}$ to $x_{(i+4)3}$ and $X_{(i+8)0}$ to $X_{(i+8)3}$ and $X_{(i+12)0}$ to $X_{(i+12)3}$ into the first SIMD vector, and converting bytes of the first SIMD vector from unsigned to signed;

II. loading predicted values of the macroblock of the positions one of: $x_{i0}$ to $x_{i3}$ into a second SIMD vector, $x_{i0}$ to $x_{i3}$ and $x_{(i+4)0}$ to $x_{(i+4)3}$ into the second SIMD vector, and $x_{i0}$ to $x_{i3}$ and $x_{(i+4)0}$ to $x_{(i+4)3}$ and $x_{(i+8)0}$ to $x_{(i+8)3}$ and $X_{(i+12)0}$ to $x_{(i+12)3}$ into the second SIMD vector, and converting bytes of the second SIMD vector from unsigned to signed;

III. subtracting values of the first SIMD vector and the values of corresponding positions of the second SIMD vector and performing a 8-bit saturation of the resulting values and loading the resulting values into a third SIMD vector;

IV. transforming the third SIMD vector horizontally with 8-bit saturation arithmetic and loading the result into a fourth SIMD vector;

V. transposing the fourth SIMD vector; and

VI. transforming the fourth transposed SIMD vector vertically with 8-bit saturation arithmetic and loading the result into a fifth SIMD vector.

2. The method according to claim 1, further comprising the steps of:
   a) setting i=0;
   b) performing the steps I-VI;
   c) setting i=i+1; and
   d) repeating step b) and c) if i<4.

3. The method according to claim 2, further comprising comparing values of the fifth SIMD vector associated with the 4×4 pixel block of the macroblock with corresponding values in a vector of thresholds, and if more than a predefined number of the values of the fifth SIMD vector associated with the 4×4 pixel block are lower than the corresponding values in a vector of thresholds, then defining the 4×4 pixel block as skipped.

4. The method according to claim 2, further comprising weighting and summing values of the fifth SIMD vector associated with the 4×4 pixel block of the macroblock resulting in an energy value associated with the 4×4 pixel block, and if the energy value is lower than a predefined threshold, then defining the 4×4 pixel block as skipped.

5. The method according to claim 1, wherein the performing of the 8-bit saturation of the resulting values includes assigning all resulting values higher than 127 to 127, and assigning all resulting values lower than −128 to −128.

6. The method according to claim 1, wherein the converting of bytes from unsigned to signed includes adding −128 to the respective bytes.

7. The method according to claim 1, wherein the coding standard is a H.264/AVC coding standard.

8. The method according to claim 1, wherein the processor device is an Intel processor device.

9. The method according to claim 1, wherein the processor device is an Advanced Micro Devices (AMD) processor device.

10. A computer program product for implementing video coding in a processor device for preparing to determine whether 4×4 pixel blocks within a macroblock of transformed residual pixel values should be indicated as skipped according to a coding standard, where the pixel position values of the macroblock are denoted as $x_{ij}$, where i is the vertical pixel position within the macroblock and j is the horizontal pixel position of the macroblock, the computer program product being stored on a non-transitory computer readable medium, which when executed by a processor, cause the processor to perform the steps of:

I. loading current values of the macroblock of the positions one of: $x_{i0}$ to $x_{i3}$ into a first Single Instruction, Multiple Data (SIMD) vector, $x_{i0}$ to $x_{i3}$ and $x_{(i+4)0}$ to $x_{(i+4)3}$ into the first SIMD vector, and $x_{i0}$ to $x_{i3}$ and $X_{(i+4)0}$ to $x_{(i+4)3}$ and $x_{(i+8)0}$ to $x_{(i+8)3}$ and $x_{(i+12)0}$ to $x_{(i+12)3}$ into the first SIMD vector, and converting bytes of the first SIMD vector from unsigned to signed;

II. loading predicted values of the macroblock of the positions one of: $x_{i0}$ to $x_{i3}$ into a second SIMD vector, $x_{i0}$ to $x_{i3}$ and $x_{(i+4)0}$ to $x_{(i+4)3}$ into the second SIMD vector and $x_0$ to $xi_3$ and $x_{(i+4)0}$ to $x_{(i+4)3}$ and $x_{(i+8)0}$ to $x_{(i+8)3}$ and $x_{(i+12)0}$ to $x_{(i+12)3}$ into the second SIMD vector, and converting bytes of the second SIMD vector from unsigned to signed;

III. subtracting values of the first SIMD vector and the values of corresponding positions of the second SIMD vector and performing a 8-bit saturation of the resulting values and loading the resulting values into a third SIMD vector;

IV. transforming the third SIMD vector horizontally with 8-bit saturation arithmetic and loading the result into a fourth SIMD vector;

V. transposing the fourth SIMD vector; and

VI. transforming the fourth transposed SIMD vector vertically with 8-bit saturation arithmetic and loading the result into a fifth SIMD vector.

11. A processor device for preparing to determine whether 4×4 pixel blocks within a macroblock of transformed residual pixel values should be indicated as skipped according to a coding standard during video coding, where the pixel position values of the macroblock are denoted as $x_{ij}$, where i is the vertical pixel position within the macroblock and j is the horizontal pixel position of the macroblock, the processor device further comprising a processing circuit configured to:

I. load current values of the macroblock of the positions one of: $x_{i0}$ to $x_{i3}$ into a first Single Instruction, Multiple Data (SIMD) vector, $x_{i0}$ to $x_{i3}$ and $x_{(i+4)0}$ to $x_{(i+4)3}$ into the first SIMD vector, and $x_{i0}$ to $x_{i3}$ and $x_{(i+4)0}$ to $x_{(i+4)3}$ and $x_{(i+8)0}$ to $x_{(j+8)3}$ and $x_{(i+12)0}$ to $x_{(i+12)3}$ into the first SIMD vector, and converting bytes of the first SIMD vector from unsigned to signed;

II. load predicted values of the macroblock of the positions one of: $x_{i0}$ to $x_{i3}$ into a second SIMD vector, $x_{i0}$ to $x_{i3}$ and $x_{(i+4)0}$ to $x_{(i+4)3}$ into the second SIMD vector, and $x_{i0}$ to $x_{i3}$ and $x_{(i+4)0}$ to $x_{(i+4)3}$ and $x_{(i+8)0}$ to $x_{(i+8)3}$ and $x_{(i+12)0}$ to $x_{(i+12)3}$ into the second SIMD vector, and converting bytes of the second SIMD vector from unsigned to signed;

III. subtract values of the first SIMD vector and the values of corresponding positions of the second SIMD vector and performing
a 8-bit saturation of the resulting values and loading the resulting values into a third SIMD vector;

IV. transform the third SIMD vector horizontally with 8-bit saturation arithmetic and loading the result into a fourth SIMD vector;

V. transpose the fourth SIMD vector; and

VI. transform the fourth transposed SIMD vector vertically with 8-bit saturation arithmetic and loading the result into a fifth SIMD vector.

12. The processor device according to claim 11, wherein the processor circuit is further configured to:
a) set i=0;
b) perform the steps I-VI;
c) set i=i+1; and
d) repeat step b) and c) if i<4.

* * * * *